United States Patent
Kristensson et al.

(10) Patent No.: US 10,082,864 B2
(45) Date of Patent: Sep. 25, 2018

(54) GAZE BASED TEXT INPUT SYSTEMS AND METHODS

(71) Applicant: Tobii AB, Danderyd (SE)

(72) Inventors: Per Ola Kristensson, Stockholm (SE); Keith Vertanen, Stockholm (SE); Morten Mjelde, Stockholm (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 14/843,630

(22) Filed: Sep. 2, 2015

(65) Prior Publication Data

US 2016/0062458 A1 Mar. 3, 2016

Related U.S. Application Data

(60) Provisional application No. 62/044,817, filed on Sep. 2, 2014.

(51) Int. Cl.
*G09G 5/00* (2006.01)
*G06F 3/01* (2006.01)
(Continued)

(52) U.S. Cl.
CPC ............ *G06F 3/013* (2013.01); *G06F 3/0236* (2013.01); *G06F 3/0237* (2013.01);
(Continued)

(58) Field of Classification Search
None
See application file for complete search history.

(56) References Cited

U.S. PATENT DOCUMENTS

2009/0125849 A1* 5/2009 Bouvin ................ G06F 3/013
715/863
2012/0086645 A1* 4/2012 Zheng ................ G06F 3/013
345/168
(Continued)

FOREIGN PATENT DOCUMENTS

CN 107209552 A 9/2017
EP 3189398 A1 7/2017
(Continued)

OTHER PUBLICATIONS

Majaranta, et al., "Twenty years of eye typing: Systems and Design Issues", Proceedings Etra 2002 Eye Tracking Research & Applications Symposium, Jan. 1, 2002, pp. 15-22, 8 pages.
(Continued)

*Primary Examiner* — Stephen T Reed
(74) *Attorney, Agent, or Firm* — Kilpatrick Townsend & Stockton LLP

(57) ABSTRACT

According to the invention, a method for entering text into a computing device using gaze input from a user is disclosed. The method may include causing a display device to display a visual representation of a plurality of letters. The method may also include receiving gaze information identifying a movement of the user's gaze on the visual representation. The method may further include recording an observation sequence of one or more observation events that occur during the movement of the user's gaze on the visual representation. The method may additionally include providing the observation sequence to a decoder module. The decoder module may determine at least one word from the observation sequence representing an estimate of an intended text of the user.

24 Claims, 9 Drawing Sheets

(51) Int. Cl.
  *G06F 3/0484* (2013.01)
  *G06T 11/60* (2006.01)
  *G06F 3/023* (2006.01)

(52) U.S. Cl.
  CPC .......... *G06F 3/04842* (2013.01); *G06T 11/60* (2013.01); *G09G 5/00* (2013.01)

(56) References Cited

U.S. PATENT DOCUMENTS

| 2013/0135196 A1* | 5/2013 | Park | G06F 3/01 345/156 |
| 2013/0176533 A1* | 7/2013 | Raffle | A61B 3/113 351/209 |
| 2014/0002341 A1* | 1/2014 | Nister | G06F 3/013 345/156 |
| 2015/0364140 A1* | 12/2015 | Thorn | G06F 17/24 704/235 |

FOREIGN PATENT DOCUMENTS

| WO | 2016/036862 A1 | 3/2016 |
| WO | 2016036862 | 3/2016 |

OTHER PUBLICATIONS

International Search Report and Written Opinion for PCT Patent Application No. PCT/US2015/048154, "International Search Report and Written Opinion", dated Nov. 5, 2015, 12 pages.

Salvucci, "Inferring Intent in Eye-Based Interfaces: Tracing Eye Movements With Process Models", Chi Conference Proceedings, Human Factors in Computing Systems, May 15, 1999, pp. 254-26, 8 pages.

International Application No. PCT/US2015/048154, International Preliminary Report on Patentability dated Mar. 16, 2017, 8 pages.

* cited by examiner

GAZE BASED TEXT INPUT SYSTEMS AND METHODS

CROSS-REFERENCE TO RELATED APPLICATIONS

This application claims priority to Provisional U.S. Patent Application No. 62/044,817 filed Sep. 2, 2014, entitled "GAZE BASED TEXT INPUT SYSTEMS AND METHODS," the entire disclosure of which is hereby incorporated by reference, for all purposes, as if fully set forth herein.

BACKGROUND OF THE INVENTION

The present invention generally relates to systems and methods for gaze based text input, and in particular, to systems and methods for utilizing gaze to provide text input based on the user's gaze indicating a desire to select a letter.

Providing text input to a computing device is a key requirement for efficient human computer interaction. Traditionally text input is provided by way of a keyboard, or in the case of computing devices using touch screens an on screen keyboard may be used. These approaches all require physical contact by a user onto a device.

In some instances it is desirable to provide a means for inputting text to a computing device whereby physical contact with the device or other input means is not required. This could be used for example where a user does not possess control of his or her hands, or where a user is unable to contact a device as they are using their hands for another purpose. One possible solution is to use speech recognition software allowing a user to communicate audibly their input.

The problems with this approach include that it may be too slow to be convenient, may require extensive training of a speech recognition algorithm prior to use thereof, or may not be available to a user who also has speech disorder, up to and including muteness, which prevents such software from working properly or being an option whatsoever. Thus, speech recognition software may not provide a useful and/or reliable method of providing text input to a computing device.

While basic methods of using a gaze based text input are available, they may suffer from slowness or inaccuracy. Embodiments of the invention may provide solutions to at least some of the aforementioned problems.

BRIEF DESCRIPTION OF THE INVENTION

In one embodiment, a method for entering text into a computing device using gaze input from a user is provided. The method may include causing a display device to display a visual representation of a plurality of letters. The method may also include receiving gaze information identifying a movement of the user's gaze on the visual representation. The method may further include recording an observation sequence of one or more observation events that occur during the movement of the user's gaze on the visual representation. The method may additionally include providing the observation sequence to a decoder module. The decoder module may determine at least one word from the observation sequence representing an estimate of an intended text of the user.

In another embodiment, a system for entering text into a computing device using gaze input from a user is provided. The system may include an eye tracking device, a display device, and a computing device. The computing device may be configured to at least cause a display device to display a visual representation of a plurality of letters. The computing device may also be configured to receive gaze information identifying a movement of the user's gaze on the visual representation. The computing device may further be configured to record an observation sequence of one or more observation events that occur during the movement of the user's gaze on the visual representation. The computing device may additionally be configured to provide the observation sequence to a decoder module. The decoder module may determine at least one word from the observation sequence representing an estimate of an intended text of the user.

In another embodiment, a non-transitory machine readable medium having instructions stored thereon for entering text into a computing device using gaze input from a user is provided. The instructions may be executable by one or more processors for causing a display device to display a visual representation of a plurality of letters. The instructions may also be executable for receiving gaze information identifying a movement of the user's gaze on the visual representation. The instructions may further be executable for recording an observation sequence of one or more observation events that occur during the movement of the user's gaze on the visual representation. The instructions may additionally be executable for providing the observation sequence to a decoder module. The decoder module may determine at least one word from the observation sequence representing an estimate of an intended text of the user.

BRIEF DESCRIPTION OF THE DRAWINGS

The present invention is described in conjunction with the appended figures.

Figure 1:
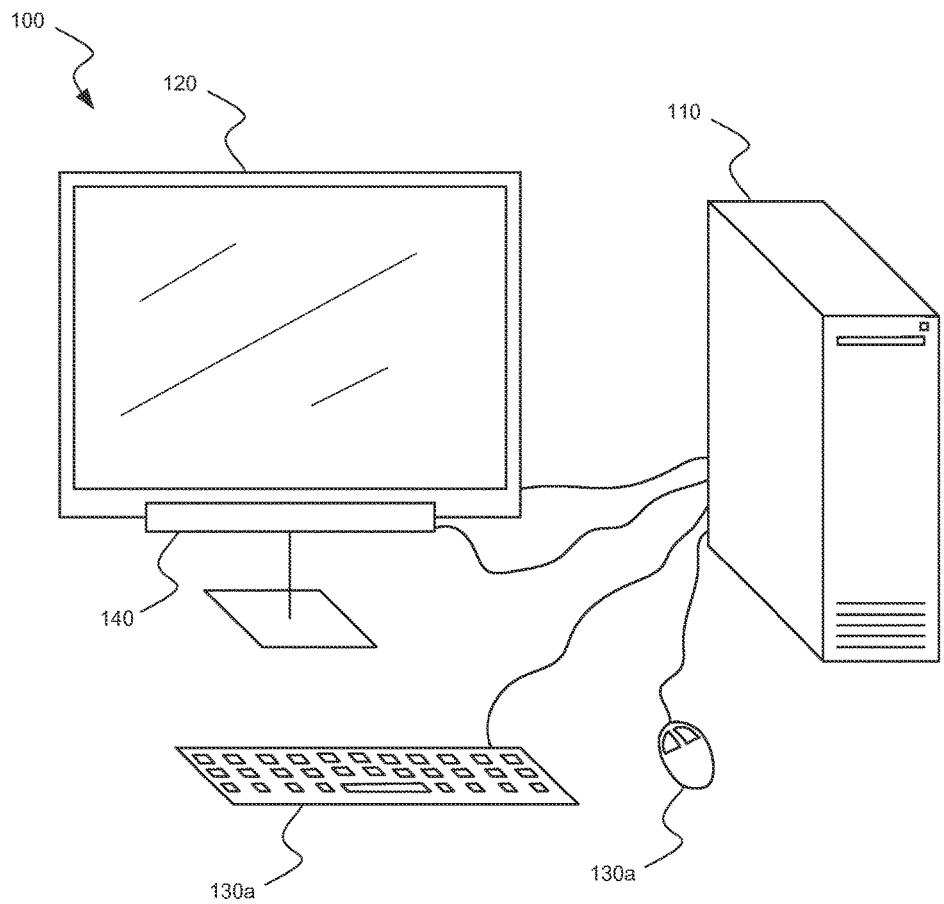
FIG. 1 is a representation of one environment in which systems and methods of the invention may be implemented.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to transitory and non-transitory, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token-passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Turning now to FIG. 1, one system 100 is shown which may implement embodiments of the invention. System 100 may include a computing device 110, a display device 120, traditional input devices 130 (keyboard 130a and mouse 130b), and eye tracking device 140.

Computing device 110, though shown in this embodiment as a desktop computer, may be any type of computing device in other embodiments. Merely by way of example, computing device 110 may be a laptop computer, a notebook computer, a tablet computer, a personal data assistant, a mobile device, a mobile phone, a smart watch or other wearable electronics, etc. In some embodiments, various other components of system 100 may be integrated with computing device 110. For example, a tablet computer may have an integrated display device 120, as well as a touch-screen version of keyboard 130a.

Display device 120 may be capable of displaying information as directed by computing device 110. As discussed above, display device 120 may be integrated with, or separate to, computing device 110. Eye tracking device 140 may be any form of known eye tracking device which allows for determination of a user's gaze direction. Eye tracking device 140 may utilize computing device 110 for processing information to determination a user's gaze direction, or eye tracking device 140 may perform all processing directly.

One example of a suitable eye tracking device 140 is an infrared based device where infrared light is emitted towards a user's eye or eyes and an image sensor captures images of the user's eye or eyes comprising a reflection of the infrared light. Processing of these images can determine a user's gaze direction from the position and orientation of the reflection or reflections of infrared light. This will be readily understood by a person skilled in the art. Eye tracking device 140 may be configured to track a user's gaze direction relative to display device 120.

Figure 2:
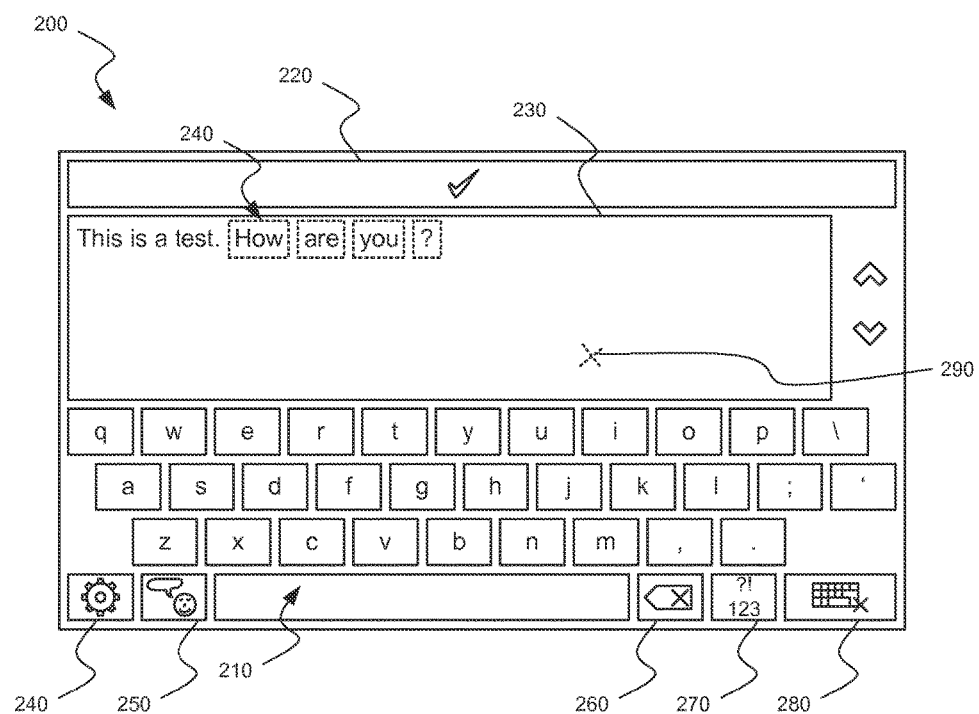
FIG. 2 is one display screen of various embodiments of the invention for entering text into a computing device via a gaze input by a user.

Turning now to FIG. 2, in one embodiment of the invention, computing device 110 may cause display device 120 to display a text entry interface 200 to a user. Interface 200 may include a representation of letters on the display, for example an on-screen keyboard 210, an input termination area 220, and a message window 230. In broad terms the systems and methods of the invention may function by allowing the user to gaze at or near the letters displayed on on-screen keyboard 210 in the order in which the user desires to spell a word or words. In this example, the user has recently gazed in a pattern at the keys such that "This is a test." has previously been entered, and "How are you?" has more recently been entered. Recently entered text may be notated in any number of fashions, perhaps by highlighting, and shown here as dashed boxes 240.

To terminate the input of a word or words, hereinafter understood to include numbers, punctuation, and any other textual input, the user then may gaze at the termination area 220, thereby instructing computing device 110 that the user desires to terminate text input (at least for the time being). Further alternatives to the user gazing at termination area 220 as a means for terminating input will be described in detail below. As the user gazes at letters, or after the user has gazed at the termination area 220, the word or words spelt by the user may be displayed in the message window 230.

Interface 200 may also include a settings icon 240, a speech recognition input icon 250, a backspace icon 260, an alternative characters icon 270, a confirmation icon 280, and a visualization of the user's current gaze point 290. Each of the icons may be activated by the persistence of the user's gaze thereon to cause a certain affect. Settings icon 240 may cause a settings interface to be presented to allow the user to adjust operation of embodiments of the invention. Speech recognition input icon 250 may allow a user to activate a speech recognition software package for the input of text. Backspace icon 260 may allow a user to delete the last entered letter or word. Alternative characters icon 270 may allow the user to change the characters displayed by on-screen keyboard 210. Confirmation icon 280 may allow a user to confirm that recently entered words (highlighted via dashed boxes 240) are indeed as the user intended to be entered. Visualization of the user's current gaze point 290, though shown here as a dashed-X, may be presented in other manners depending on the embodiment, and may or may not always be displayed, perhaps depending on how long the user's gaze has rested on a particular point or area of interface 200.

Figure 3:
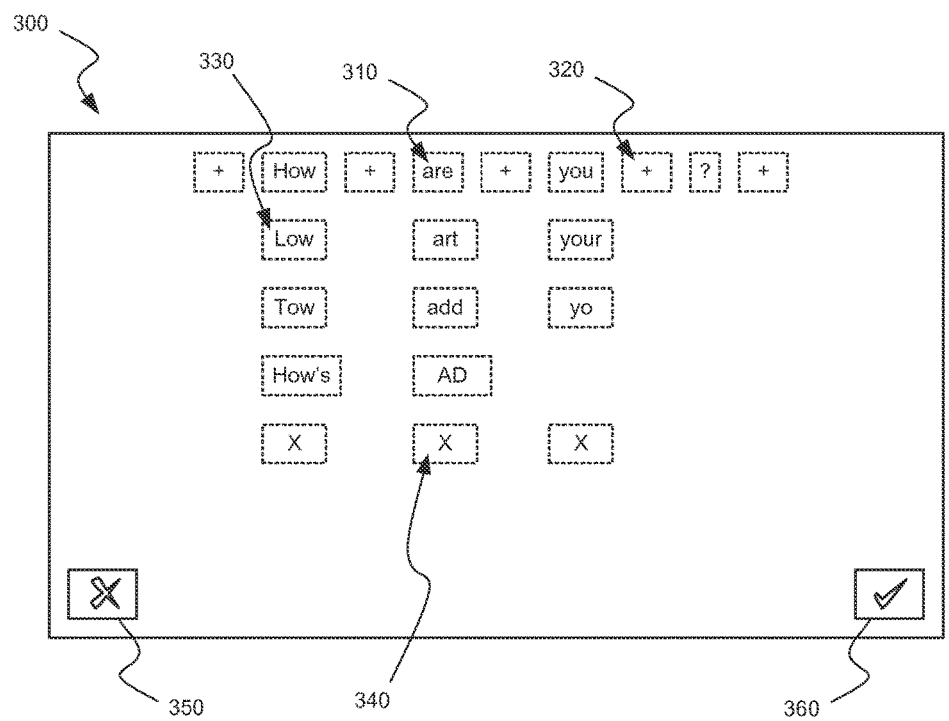
FIG. 3 is another display screen of various embodiments of the invention for correcting text entered via the display screen of FIG. 2.

A second interface 300 of various embodiments of the invention is shown in FIG. 3. Error correction interface 300 may be activated by the user's gaze being directed to a word or words in message window 230. Once computing device 110 determines that such a gaze event is detected, interface 300 may be displayed to allow the user to correct text entry either mis-entered by the user, or mis-interpreted by computing device 110.

Interface 300 may include a word or words 310 which were at the location, or surround the location in which the user gazed at them in message window 230 of interface 200. "+" signs 320 may be displayed between words 310 to provide the user with a place to gaze to indicate to computing device 110 that they desire to enter additional words at that location. Below one or more of words 310, potential replacement words 330, as intelligently hypothesized by computing device 110 may be displayed so that the user may select them via their gaze to replace the original words 310. A deletion icon 340 (symbolized by an 'X' or other symbol) may allow a user to delete a given word 310.

A cancel icon 350 may also be provided so that the user may, with their gaze, cancel the input of any corrections and return to interface 200. An accept icon 360 may allow a user to accept all changes made and return to interface 200.

Figure 4:
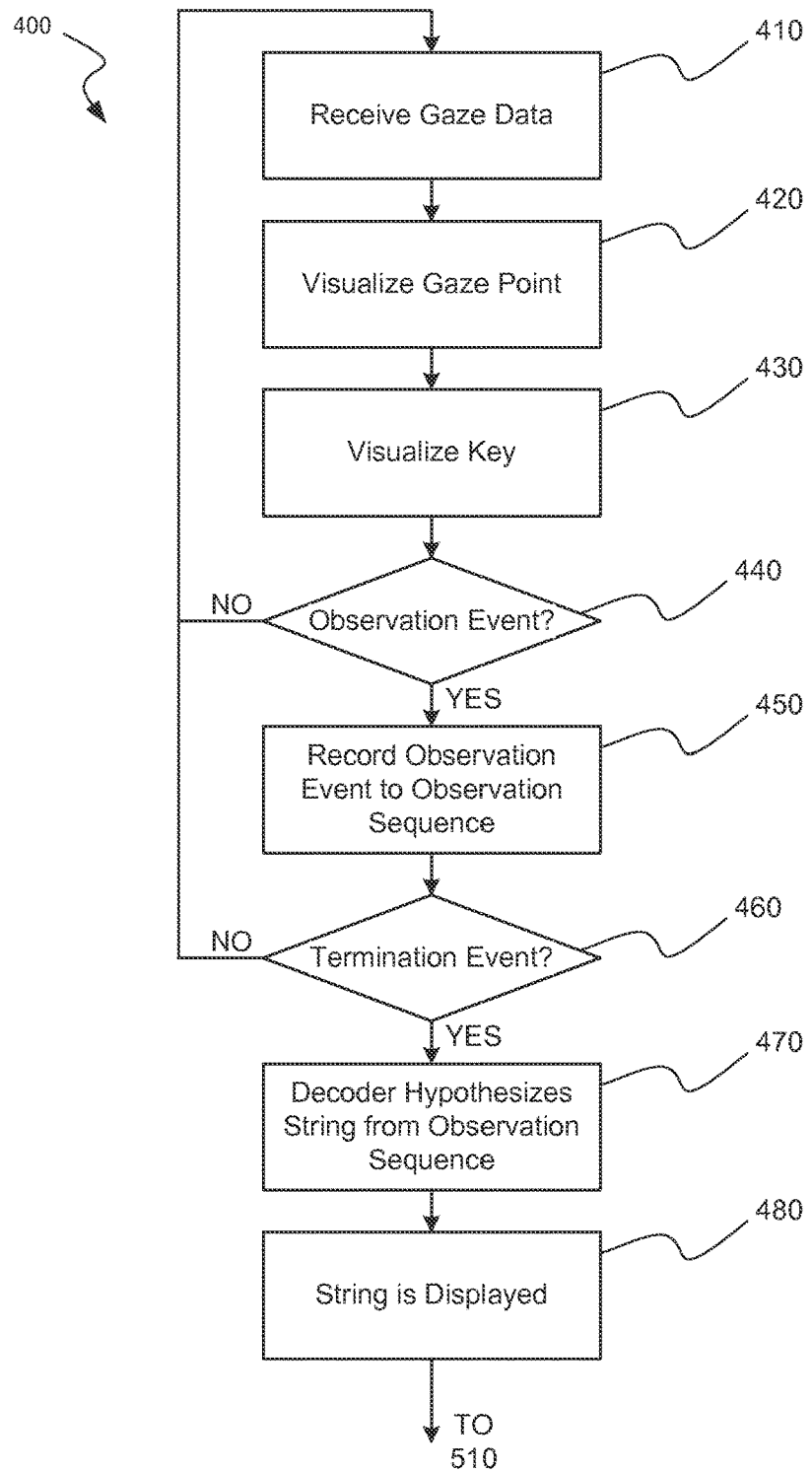
FIG. 4 is a flow diagram of one method of the invention for entering text into a computing device via a gaze input by a user.
Figure 5:
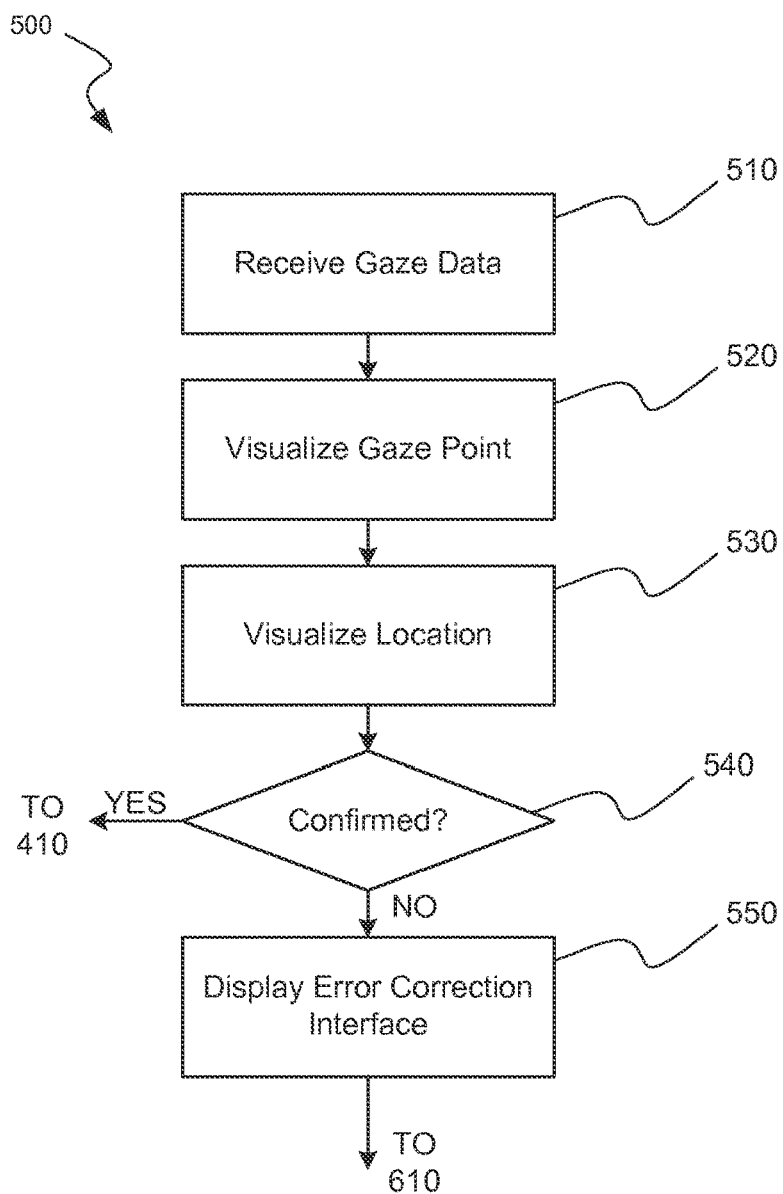
FIG. 5 is a flow diagram of one method of the invention for determining whether to provide a display screen for correcting previously entered text.
Figure 6:
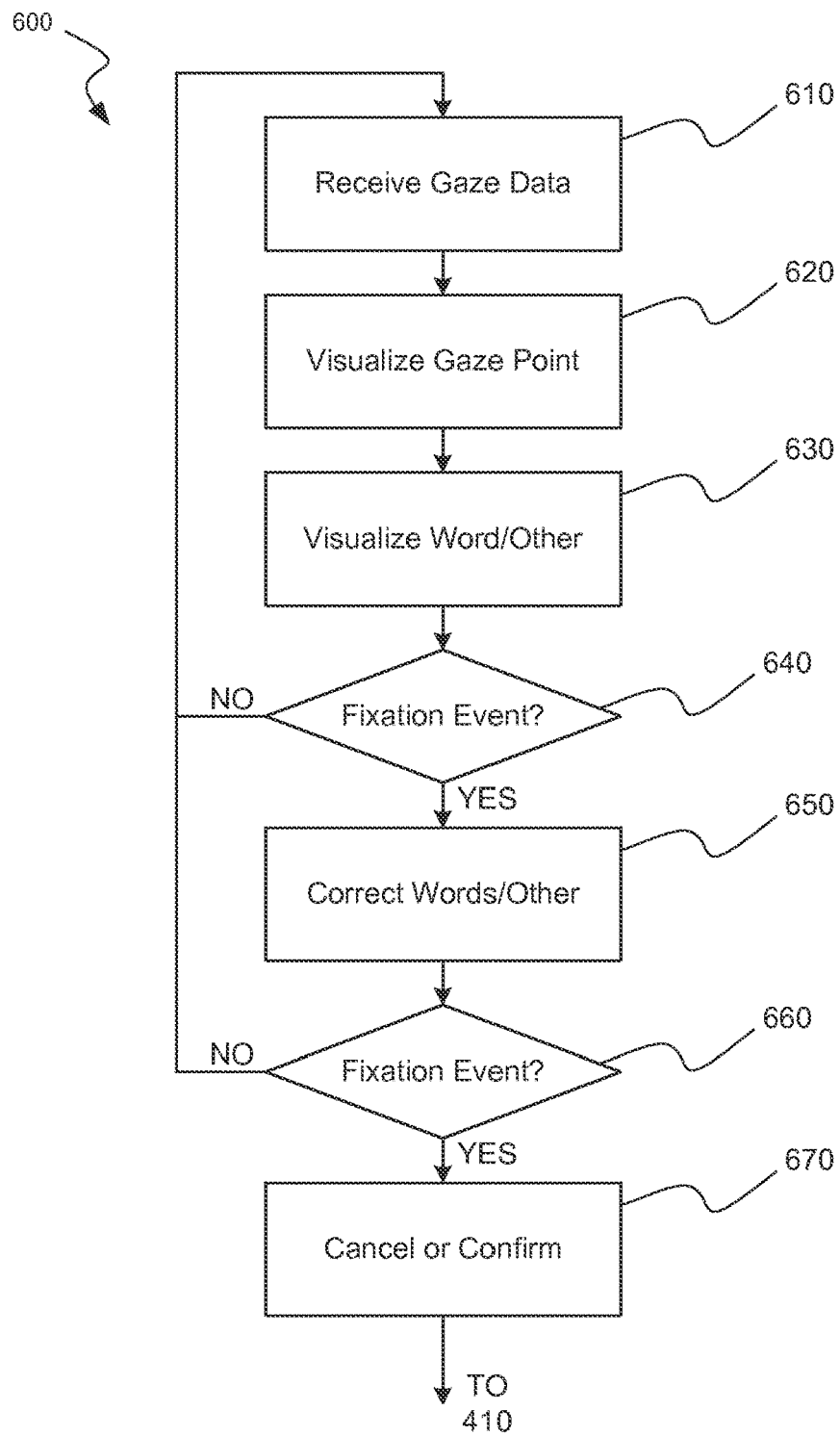
FIG. 6 is a flow diagram of one method of the invention for correcting previously entered text.

Turning now to FIGS. 4-6, an exemplary method 400, 500, 600 of the invention employing system 100 and interfaces 200, 300 will be discussed. Upon display of interface 200, method 400, at block 410, may receive continual gaze data associated with a user's gaze as provided by computing device 110 and eye tracking device 140. At block 420, the gaze point may be visualized as is gaze point 290 in FIG. 2. At block 430, one or more 'keys' (letter or symbol on on-screen keyboard 210) may be visualized to indicate to the user that computing device 110 determines the user's gaze is located at that position.

At block 440, the location of the gaze of the user on display device 120 is monitored for the occurrence of an observation event. An observation event occurs when computing device 110 (and/or eye tracking device 140, which will be assumed henceforth when referring to computing device 110) determines that the user's gaze has been fixated on or near a character on the on-screen keyboard 210. An observation event may occur based on any one or more of the following characteristics: fixation of the user's gaze on or near a character or characters; an approximation of the region of the fixation, the x, y coordinates of a fixation; the duration of the fixation; the size of the fixation; another coordinate system based on measurements of pixels or standard or metric distance, etc.; other characteristic; any combination of the above.

At block 450 the observation event is recorded and combined in a serial manner with previously recorded observation events, each stored event possibly including any of the above or more characteristics associated with the observation event. So long as no termination event is detected at block 460, this process will repeat such that detected observation events are continually recorded until a termination event occurs ending the observation sequence.

A termination event occurs at block 460 based on any one or more possible events, depending on the embodiment. Some examples, not by way of limitation, include: detection of a user's gaze within termination area 220 for a predetermined period of time; the user implicitly terminating by time-out (the user's gaze has remained static anywhere on the display for a fixed amount of time); the user looking away by looking outside the display; the user blinking, either a single blink or two or more blinks; the user making a facial gesture such as smiling or other affective signal; the user articulating a specific gaze gesture (e.g., combination of gaze movements) for the predetermined/predefined purpose of causing a termination; computing device 110 inferring a termination, for example, by determining that the user's gaze articulation has terminated by computing the probability of this event continuously after each gaze observation has been received (i.e., making a determination that a likelihood of termination has occurred); activation of a tactile input device such as a keyboard, mouse, touchscreen, etc.; a verbal or other sound made by the user; a hand gesture, head gesture, or gesture with other body part or object; a brain signal detected via an electroencephalogram or the like.

Upon termination at block 460, method 400 continues to block 470 where a decoding module/algorithm hypothesizes a string (phrase, sentence, etc.) from the observation sequence. As will be discussed below, the decoding module may hypothesize the string using a number of methods, including a token-passing decoder. Upon one or more hypotheses being determined, one or more correlating strings may be displayed in message window 230 at block 480. In the case of two hypotheses which have a reasonable chance of reflecting the string intended by the user, both strings may be displayed for selection by the user (by gaze fixation or other input mechanism).

Additional gaze text input may then be received per method 400, but at block 510, as gaze data is again received, and visualized at blocks 520, 530 (similar to blocks 420, 430), a confirmation of the displayed string as being indicative of the desired string of the user is awaited at block 540. This may occur by the user fixating their gaze on confirmation icon 280. In that case, the method returns to block 410 to await further text entry or termination of the text entry interface. However, if the user fixates their gaze at a particular word, letter, or other symbol in message window 230, at block 550 the error correction interface 300 is then displayed.

In error correction interface 300, the word, character or other symbol fixated upon by user in interface 200 is displayed along with surrounding words from the string. Other words which the decoding module may hypothesize as other probable words, characters, or symbols intended as the correct input by the user may be displayed below the originally hypothesized words, characters, or symbols displayed. Following receipt of gaze data at block 610, visualized at blocks 620, 630 (similar to blocks 420, 430), a fixation event is awaited at block 640. A user may fixate for a predetermined period on any word option in order to select the words most desired. At block 650, such words/characters/symbols are changed upon occurrence of the event. If the user desires to delete a word, character, or symbol, the user fixates upon deletion icon 340 associated with (below) the word, character, or symbol desired to be deleted. If the user desires to insert a new word, the user fixates upon the insert icon 44. Words may be added by the user using the "+" signs 320. Fixation of the user's gaze on the "+" signs 320 may cause an interface the same as or similar to interface 200 to be provided for text entry. Alternatively or concurrently, an alternative input device such as a mouse, keyboard, etc. may be used to enter or correct words whenever addition and/or correction are described herein. These corrections may continue to occur until a different type of fixation event occurs at block 660.

At block 660, a fixation by the user's gaze on cancel icon 350 or accept icon 360 is awaited. If such a fixation does not occur, then method 600 repeats until the user has made all corrections desired by the user are made. If fixation on cancel icon 350 occurs, then the method returns to block 410 without correction of the string. If fixation on accept icon 360 occurs, then the method returns to block 410 with the corrections made by the user to the string being completed and displayed in message window 230.

Focusing now on the decoder module, such module is a software program that takes as an input an observation sequence comprised of at least one observation event. The decoder outputs a series of text, most normally forming a sentence or the like, that represents an estimation of a user's intended series of text.

In one embodiment of the present invention the decoder is implemented as a token-passing decoder whereby a token comprises three items of information: a probability in log-space accumulated thus far (log-prob), a context of word and character language model, and the token's position in the observation sequence. Such token-passing decoders will be familiar to those skilled in the art, and the operation thereof with respect to the embodiments of the invention will likewise now become apparent. Further information regarding token-passing decoders may be found in Young, S., Russel, N. H and Thornton, J. H. S. 1989, "Passing: A Simple Conceptual Model for Connected Speech Recognition Systems," Technical Report, Cambridge University Engineering Department, which is incorporated by reference for all purposes as if fully set forth herein.

Each token represents a hypothesis: a sequence of letters that might be the intended text of the user. A token is terminated when the token has seen all observations in the observation sequence. The decoder will, via the set of terminated tokens, output a set of hypotheses. The most likely hypothesis corresponds to the sequence of letters that are most likely to correspond to the user's intended text.

To compute a probability two models may be used, the first is a keyboard model, which computes the likelihood of an observation given a hypothesized letter. The keyboard model assigns one or several distributions, for example two-dimensional Gaussian distributions, non-parametric distributions, Gaussian Processes onto each key. The keyboard model distribution is used to compute the likelihood given the X and Y locations in the observation. The currently implemented system assigns two-dimensional Gaussian distributions onto each key.

An alternative system design (not currently implemented) could estimate likelihoods using a decision rule, a decision tree, a variant of a random forest, a support vector machine, or another machine learning technique.

The second model possible is a character and word language model. The character language model computes the prior probability of a hypothesized letter given previous letters in the current hypothesis (as tracked by a token in the search). The word language model is used to compute the prior probability of a hypothesized word given.

The decoder utilizes a decoding algorithm to propagate tokens at each step along the formation of the hypothesis. In order to constrain the search to maintain a manageable size, redundant tokens may be merged when two or more tokens have reached the same (possibly tentative) conclusion. Another possible technique which may be implemented by the decoding module is known as beam pruning, which constrains the search using a configurable beam width when the token hypothesis is not high enough to justify keeping it.

The token propagation rule used by the decoding algorithm may include:

[A] (SUBSTITUTION) Given the current observation: compute the likelihood of that observation for each key using the keyboard model; the old token creates a new token for every key on the keyboard; the probability for the new token is: the log-prob of the observation given the specific key+ the character language model probability (scaled by a scale factor)+ the log-prob accumulated so far by the old token; and optionally, if the new token is generating a word separator, for instance a spacebar character, then additionally add a log-prob based on the word language model. If the letter sequence is not modeled by the vocabulary of the word language model then assess the letter sequence using an unknown word model.

[B] (DELETION) Given the current observation: ignore the observation and the token gets propagated to the next observation in the observation sequence and accumulates a fixed log-prob penalty.

[C] (INSERTION) Given the current observation: propagate tokens to all possible keys on the keyboard; the probability for a new token is: the log-prob accumulated so far by the old token+ a new log-prob based on the character language model (scaled by scale factor)+ an additional log-prob penalty which is different depending on if we are inserting the same keyboard key as before or not; optionally, if the new token is generating a word separator, for instance a spacebar character, then additionally add a log-prob based on the word language model. If the letter sequence is not modeled by the vocabulary of the word language model then assess the letter sequence using an unknown word model.

[D] (PRUNING) After the Substitution, Insertion and Deletion cases, before propagating a token, beam pruning is applied as follows: for each observation index in the observation sequence, the system stores the best log-prob generated by any token so far for that observation index; a new token is only propagated to a new observation index if the difference between its generated log-prob and the best log-prob ever generated by a token for that observation index is within a configurable threshold (i.e. the beam width). The threshold is a speed-accuracy tradeoff.

[E] (TERMINATION) All non-pruned tokens are checked to see if they are at the last observation index. If they are: take the token's existing log-prob add a log-prob from the character language model that models the end-of-sentence symbol (scaled by a scale factor); optionally, add a log-prob based on the word language model. If the letter sequence is not modeled by the vocabulary of the word language model then assess the letter sequence using an unknown word model.

[F] (MERGING) Tokens with identical language model context are merged.

The output of the decoding algorithm is the letter sequence modeled by the hypothesis of the terminated token with the highest probability. Alternative decoding strategies may also be suitable for the present invention, such as:

[1] String-based matching: Add all letters that are identified via gaze, for example by fixating upon them, to a buffer. Apply a string-based rule comprising of valid words, remove any letters that are unlikely to form valid words. The remaining letters therefore represent the user's intended text comprising of one or more words.

[2] Spatial trajectory matching: Define words as spatial trajectories by mapping them on a displayed keyboard. Connect all fixations or other gaze-based metric together into spatial trajectories spanning one or more words. Compute matches by performing spatial trajectory comparisons in combination with a method of segmenting spatial trajectories spanning potentially many words to spatial trajectories defining single words. Further information may be found in Kristensson, P. O. and Zhai, S. 2004, "SHARK2: A Large Vocabulary Shorthand Writing System for Pen-Based Computers," in Proceedings of the 17th Annual ACM Symposium on User Interface Software and Technology (UIST 2004), ACM Press: 43-52, which is incorporated by reference for all purposes as if fully set forth herein.

In some embodiments of the invention, the following aspects may also be present the following improvements: when a token has possibly formed a word, a word-based language model may be consulted in order to determine the probability the possible word is correct; and optionally the system may generate a lattice representing the space that has been explored by previous tokens. The lattice may be rescored whereby previous token positions may be recomputed based on a language model.

The system can also generate word confusion networks (WCNs). This can either be estimated based on an N-best search or, if a lattice is available, created from the lattice. WCNs are advantageous as they are easier to work with then a lattice and are particularly useful for error correction user interfaces. See Hakkani-Tür, D., Béchet, F., Riccardi, G. and Tur, G. "Beyond ASR 1-best: Using Word Confusion Networks in Spoken Language Understanding. J. Computer Speech and Language 20, 4 (2006), 495-514; Ogata, J. and Goto, M. "Speech Repair: Quick Error Correction Just by Using Selection Operation for Speech Input Interfaces." Proc. ICSLP 2005, ISCA (2005), 133-136; Vertanen, K. and Kristensson, P. O. 2009. "Parakeet: A Continuous Speech Recognition System for Mobile Touch-Screen Devices." In Proceedings of the 14th ACM International Conference on Intelligent User Interfaces (IUI 2009). ACM Press: 237-246. All the aforementioned references are incorporated by reference for all purposes as if fully set forth herein.

As an alternative to two dimensional Gaussian distributions as models for fixation locations, Gaussian Processes (GPs) may be used, see Rasmussen, C E. and Williams, C. K. I. 2006. "Gaussian Processes for Machine Learning." MIT Press, which is incorporated by reference for all purposes as if fully set forth herein. GPs have a better capability to learn the shape of distributions onto the keys, which will result in more accurate likelihood estimations.

The decoder may model durations of fixations to improve accuracy. Durations can be modeled using a step function in which fixation durations below a set threshold are penalized by a linear function. Alternatively, durations can be modeled by a low-parameter function such as a logistic function, which can be parameterized using only two variables. Alternatively, duration can be modeled using a parametric distribution (such as a Poisson) or non-parametric distribution.

The system may further comprise an adaptive learning function whereby the results of the decoding algorithm are stored and used in a learning algorithm to adapt language models to individual users. An example of one such embodiment is described below, with respect to FIG. 9. Optionally, if the system uses Gaussian Processes for the keyboard model then the parameters can be learned from both offline and online data using a similar strategy as outlined above. Algorithmic approaches for learning the parameters of covariance functions can be found in for example: Rasmussen, C. E., and Williams, C. K. I. "Gaussian Processes for Machine Learning." MIT Press, 2006. Additional reference: Weir, D., Rogers, S., Murray-Smith, R., and Löchtefeld, M. "A User-Specific Machine Learning Approach for Improving Touch Accuracy on Mobile Devices." Proc. UIST '12. 465-476. All of the aforementioned references are incorporated by reference for all purposes as if fully set forth herein.

Figure 7:
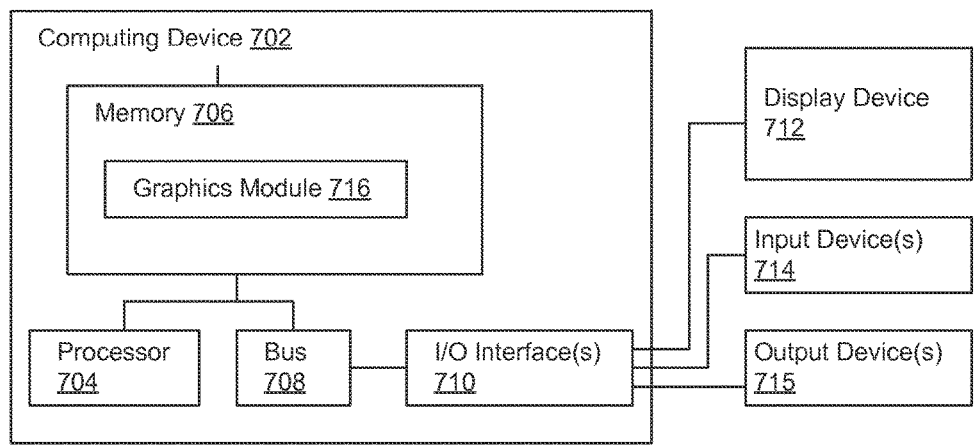
FIG. 7 is a block diagram of an exemplary computer system capable of being used in at least some portion of the apparatuses or systems of the present invention, or implementing at least some portion of the methods of the present invention.

By way of example and not limitation, FIG. 7 is a block diagram depicting an example computing device 702 for implementing some embodiments discussed herein. The computing device 702 can include a processor 704 that is communicatively coupled to a memory 706 and that executes computer-executable program instructions and/or accesses information stored in the memory 706. The processor 704 may comprise a microprocessor, an application-specific integrated circuit ("ASIC"), a state machine, or other processing device. The processor 704 can include any of a number of computer processing devices, including one. Such a processor can include or may be in communication with a computer-readable medium storing instructions that, when executed by the processor 704, cause the processor to perform the steps described herein.

The computing device 702 can also include a bus 708. The bus 708 can communicatively couple one or more components of the computing system 702. The computing device 702 can also include and/or be communicatively coupled to a number of external or internal devices, such as input or output devices. For example, the computing device 702 is shown with an input/output ("I/O") interface 710, a display device 712, input device(s) 714 and output device(s) 715.

Non-limiting examples of a display device 712 include a screen integrated with the computing device 702, a monitor external to and coupled with the computing system, etc. Non-limiting examples of input devices 714 include gaze detection devices, touch screens, touch pads, external mouse devices, microphones and/or other devices mentioned herein, etc. A non-limiting example of an output device 715 is an audio speaker. In some embodiments, the display device 712, the input device(s) 714 and the output device(s) 715 can be separate devices. In other embodiments, the display device 712 and at least some of the input device(s) 714 can be integrated in the same device. For example, a display device 712 may be a screen and an input device 714 may be one or more components providing eye-tracking and/or touch-screen functions for the display device, such as emitters for emitting light and/or cameras for imaging a user's eye(s) and/or a touch area, etc. The screen, input device components and any output device components may be integrated within the same housing or in other integrated configurations.

The computing device 702 can modify, access, or otherwise use electronic content. The electronic content may be resident in any suitable non-transitory computer-readable medium and execute on any suitable processor. In one embodiment, the electronic content can reside in the memory 706 at the computing system 702. In another embodiment, the electronic content can be accessed by the computing system 702 from a remote content provider via a data network.

The memory 706 can include any suitable non-transitory computer-readable medium. A computer-readable medium may include, but is not limited to, electronic, optical, magnetic, or other storage device capable of providing a processor with computer-readable instructions or other program code. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

A graphics module 716 stored in the memory 706 can configure the processor 704 to prepare electronic content for rendering in a graphical interface and/or render the electronic content in the graphical interface. In some embodiments, the graphics module 716 can be a stand-alone application executed by the processor 704. In other embodiments, the graphics module 716 can be a software module included in or accessible by a separate application executed by the processor 704 that is configured to modify, access, or otherwise use the electronic content.

Locked Letter Typing and Manual Engagement

In an alternative embodiment of the invention, the decoding module can create and select different hypotheses based upon the occurrence of different types of observation events. As previously described, an observation event can occur based on different characteristics, including, for example and without limitation, fixation of the user's gaze on or near a character or characters, and/or the duration of the fixation. Other characteristics may also be used to differentiate an observation event, as described below. A first type of observation event, such as a short fixation duration, can indicate a moderate likelihood that the user intended to select the character; a second type of event, such as a long fixation duration, can indicate a strong likelihood that the user intended to select the character. Types of events may be used as needed by the user to input text of higher or lower importance to the user, such as inputting a complicated password versus writing an informal email. Characters entered with high importance indicated may be referred to as "locked" or "locked letters."

In a further embodiment a string entered using locked letters can then be presented for error correction, such as by a correction method described above. The user could then adjust the entered string using the correction method. A string that has been entered using at least one locked letter and/or adjusted using an error correction method may be referred to as "manually engaged" by the user. A manually engaged string can then be received by the system as an addition to a language model (i.e., a word likely to be used again), allowing the user to personalize a vocabulary used by the decoder module. In a further embodiment, the system can optionally determine a measurement of manual engagement with the string based on user interactions. Such interactions comprise the number and/or proportion of locked letters indicated while entering the string, and the number and/or proportion of characters that have been edited using an error correction interfaces. The measurement can comprise a determined confidence value based on the interactions, and the confidence value can have a configurable threshold. In a yet further embodiment, a language model can use the confidence value to determine if or how often the language model should adapt to the user's entered text, i.e., if the user frequently corrects the system-selected hypotheses, the system may adapt and select hypotheses that are more similar to the user's entered text. Higher confidence values can result in stronger adaptation, allowing the system to incorporate words that are important to the user. Increasing the vocabulary of the language model allows the decoder module to create future hypotheses based on the added words, leading to more accurate hypotheses.

Figure 8:
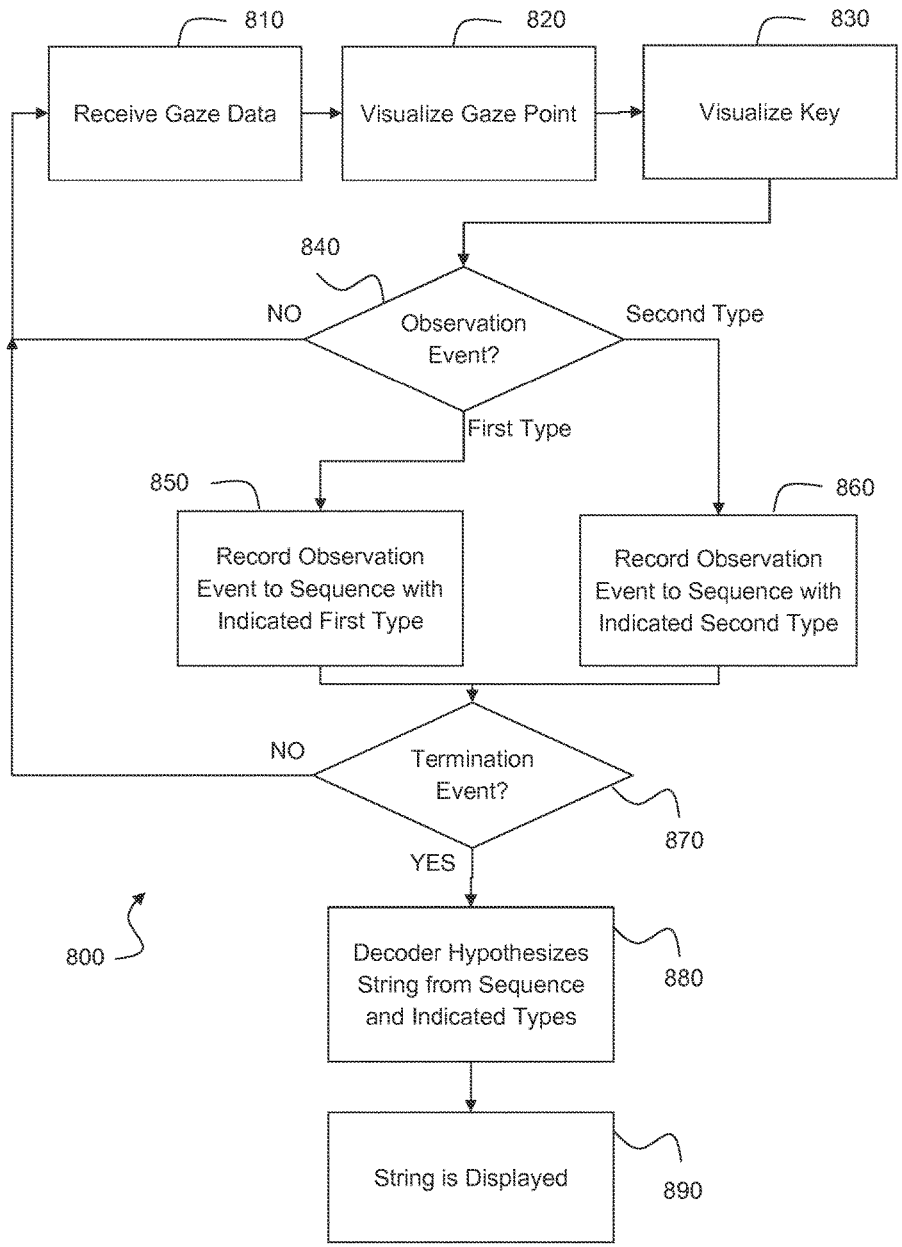
FIG. 8 is a flow diagram of one method of the invention for entering text into a computing device via multiple types of gaze inputs by a user, such that the types indicate a different level of input importance.

Turning now to FIG. 8, an exemplary method 800 of an alternative embodiments of the invention will be discussed. Comparably to the method 400, the method 800 may receive continual gaze data at block 810. The gaze point may be visualized at block 820, and one or more on-screen keyboard keys may be visualized at block 830. As the user interacts with the device, the gaze point is monitored at block 840 for both the occurrence of an observation event and for the type of observation event used. As observation events occur, a sequence of the events and types is recorded in a serial manner. The occurrence of a first type of observation event—for example, a fixation time of about 200 milliseconds on a particular character—is followed at block 850 by the recordation in the sequence of both the first observation event and the type of event. The occurrence of a second type of observation event—for example, a fixation time of about 1000 milliseconds on a particular character—is followed at block 860 by the sequence recordation of the second observation event and the event type. The example event types described here are for illustration only, and other types of event may be used without departing from the invention embodiment, including combination events. For example, the second event could be indicated by the user fixating upon a character for any amount of time and speaking the word "lock" during the fixation.

The recordation and combination of each particular observation event and type can occur for any number of events. The method steps will repeat from block 810, such that detected observation events and their respective types are continually recorded at blocks 850 or 860, until a termination event occurs. Checking for a termination event occurs at block 870; if one occurs, the method proceeds to block 880; otherwise, the method returns to block 810.

Following the termination event at 870, the method may apply a decoding module/algorithm at block 880 to hypothesize a string from the observation and type sequence. In this embodiment, the decoder module may hypothesize the string using the additional information of the type of each recorded observation event. As described above, a hypothesis represents a sequence of letters that might be the intended text of the user. The decoder module will output a set of hypotheses, and each hypothesis is assigned a probability of corresponding to the user's intended text, such that the assigned probability is at least partially based upon the type of observation event used to enter each character. Characters entered with the second type of observation event are interpreted by the decoder as locked letters, and the decoder assigns a high probability that the user entered the intended character. In some embodiments, locked letters are assigned a probability of 100% (i.e., the decoder assumes the user definitely entered the intended character); in other embodiments, the assigned probability is less than 100%. Upon one or more hypotheses being determined, one or more correlating strings may be displayed in message window 230 at block 890.

Following the display of the string, the embodiment allows the user to confirm the entered string using a confirmation interface, such as interface 200. If the user fixates their gaze at a particular symbol in the message window, an error correction interface is then displayed, such as interface 300. The embodiment then allows the user to correct the displayed string using any appropriate method.

Figure 9:
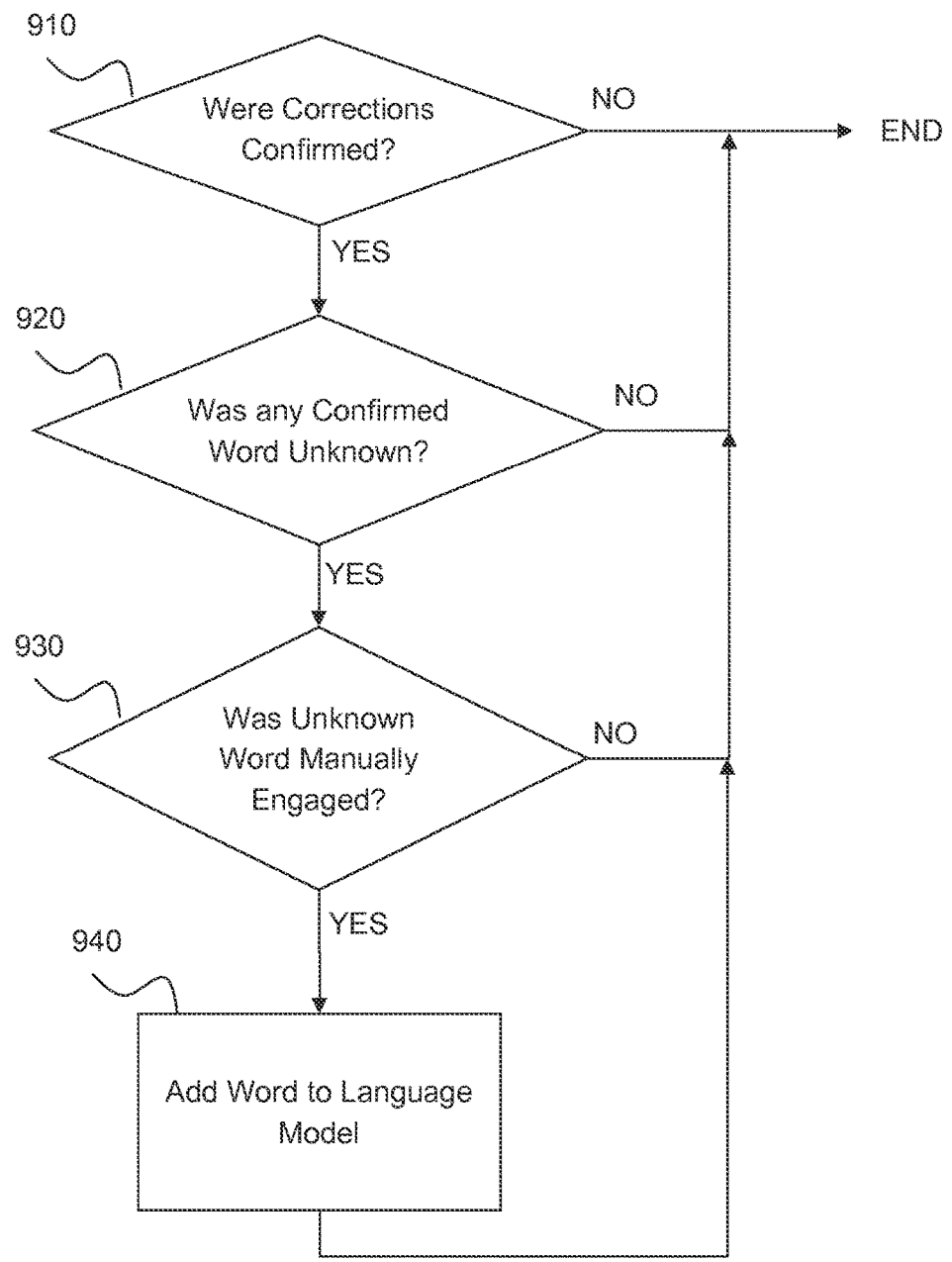
FIG. 9 is a flow diagram of one method of the invention for determining if previously entered text should be added to a language model to increase accuracy of additional entered text.

An exemplary method of an adaptive learning function is depicted in FIG. 9. Following the cancellation or confirmation of a corrected string, the embodiment may optionally further comprise an adaptive learning function whereby the results of the corrected decoding algorithm are stored and used in a learning algorithm to adapt language models to individual users. If the string was corrected, and the corrected string is unknown to the language model, and the string was manually engaged by the user, the word is added to the model. Otherwise, the word is not added, and the system awaits further gaze input.

Beginning at block 910, the method determines if any corrections of the string were confirmed; if not, the method ends. If so, the method further determines at block 920 if the corrected word or other string is unknown to a language model used by the decoding algorithm; if not, the method ends. If the corrected string is unknown, then the method further determines at block 930 if the unknown string had been manually engaged by the user, i.e., the string had been entered using at least one locked letter and/or at least one error had been corrected. If no manual engagement had occurred, the method ends. If the unknown string had been engaged, the method then adds the string to the language model as a known vocabulary word at block 940, and the method then ends. After method 900 ends at any point, the embodiment returns to a method for receiving gaze input, such as method 800 of FIG. 8.

In certain embodiments (not depicted in FIG. 9), the method could determine a measurement of manual engagement based on user interactions, such as the number and/or proportion of locked letters indicated while entering the string, and the number and/or proportion of characters that have been corrected. The measurement can comprise a confidence value, such as on an arbitrary scale of 0 to 100, and the confidence value can be determined based on the interactions. As an example, and not by way of limitation, a string that was entered with 50% of the characters locked and also corrected twice could have a higher determined confidence value than a string entered with 20% of the characters locked and no corrections. The determined measurement may be further based on other factors, such as whether the string had been entered or corrected previously. The determined measurement may need to meet a certain threshold for the word to be added to the language model, and the threshold could have a default value that is configurable by the user.

In certain further embodiments (also not depicted in FIG. 9), the method can use the confidence value to determine if or how often the language model should adapt to the user's entered text. The determination may be made based on the confidence value alone or in combination with other factors. Higher confidence values can result in stronger adaptation.

For example, and not by way of limitation, if the user corrects more than 30% of the hypotheses selected by the decoder module, and the determined confidence value of each corrected hypothesis is relatively high, the embodiment may adapt and select hypotheses that are more similar to the user's entered text.

The invention has now been described in detail for the purposes of clarity and understanding. However, it will be appreciated that certain changes and modifications may be practiced within the scope of the appended claims.

What is claimed is:

1. A method for entering text into a computing device using gaze input from a user, wherein the method comprises:
   causing a display device to display a text entry interface and a visual representation of a plurality of letters;
   receiving gaze information identifying a movement of the user's gaze on the visual representation;
   recording an observation sequence of one or more observation events that occur during the movement of the user's gaze on the visual representation;
   providing the observation sequence to a decoder module, wherein the decoder module determines at least two words from the observation sequence representing an estimate of an intended text of the user;
   causing the display device to display the estimate of the intended text in the text entry interface and to display a confirmation icon in the text entry interface, wherein a selection of the confirmation icon indicates that the intended text is correct;
   causing, based on receiving user input indicating a correction to the intended text while the confirmation input is displayed in the text entry interface, a correction interface to be displayed on the display device;
   causing the correction interface to display the intended text and an insertion icon between the two words of the intended text, the insertion icon being a place to gaze at between the two words to initiate an insertion of a word at the place between the two words;
   receiving gaze information indicating a selection of the insertion icon;
   based on the gaze information indicating the selection of the insertion icon, causing the display device to display a second visual representation of a keyboard that comprises a plurality of letters, the second visual representation displayed in association with correcting the intended text in the correction interface;
   receiving gaze information identifying a movement of the user's gaze on the second visual representation;
   replacing the insertion icon in the correction interface with the word between the two words based on the movement of the user's gaze on the second visual representation; and
   causing the display device to display the word between the two words in the text entry interface.

2. The method for entering text into a computing device using gaze input from a user of claim 1, wherein an observation event comprises a determination that the user's gaze has fixated on or near a letter.

3. The method for entering text into a computing device using gaze input from a user of claim 2, wherein the observation event is associated with one or more of the following:
   X, Y coordinates on the display device of a fixation;
   a duration of the fixation;
   a size of the fixation; or
   the letter nearest the fixation.

4. The method for entering text into a computing device using gaze input from a user of claim 1, wherein the method further comprises:
   receiving gaze information indicating a termination event, wherein causing the display device to display the estimate of the intended text occurs in response to the termination event occurring.

5. The method for entering text into a computing device using gaze input from a user of claim 4, wherein the termination event is a selection from a group consisting of:
   detection of the user's gaze in a predetermined area of the display device for a first predetermined period of time;
   detection of the user's gaze remaining static for a second predetermined period of time;
   determination of a predetermined gaze gesture by the user; and
   an automatic determination, based on some portion of the observation sequence, that a particular probability that the user desires to cause the termination event has been met or exceeded.

6. The method for entering text into a computing device using gaze input from a user of claim 1, wherein the decoder module comprises one or more algorithms comprising a token-passing decoder.

7. The method for entering text into a computing device using gaze input from a user of claim 6, wherein the token-passing decoder employs a keyboard model to compute a likelihood of an observation given a hypothesized letter.

8. The method for entering text into a computing device using gaze input from a user of claim 6, wherein the token-passing decoder employs a word language model to compute a likelihood of a hypothesized letter given previous letters in a current hypothesis.

9. The method for entering text into a computing device using gaze input from a user of claim 1, wherein the decoder module comprises an adaptive learning function by which results of the decoding module are analyzed by the decoding module to adapt the decoding module to individual users.

10. The method for entering text into a computing device using gaze input from a user of claim 4, wherein the termination event comprises:
    detection of the user's gaze not being located on the display device.

11. The method for entering text into a computing device using gaze input from a user of claim 4, wherein the termination event comprises:
    detection of one or more blinks by the user.

12. The method for entering text into a computing device using gaze input from a user of claim 4, wherein the text entry interface comprises a message window, and wherein the user input indicating the correction to the intended text comprises a gaze fixation in the message window.

13. The method for entering text into a computing device using gaze input from a user of claim 1, wherein the method further comprises:
    causing, the correction interface to display a deletion icon associated with deleting the word.

14. The method for entering text into a computing device using gaze input from a user of claim 13, wherein the method further comprises:
    receiving gaze information indicating the user is gazing at the deletion icon;
    based on the user gazing at the deletion icon, removing the word from the place between the two words.

15. A system for entering text into a computing device using gaze input from a user, wherein the system comprises:
    an eye tracking device;
    a display device; and
    a computing device configured to at least:
       cause a display device to display a text entry interface and a visual representation of a plurality of letters;
       receive gaze information identifying a movement of the user's gaze on the visual representation;
       record an observation sequence of one or more observation events that occur during the movement of the user's gaze on the visual representation;
       provide the observation sequence to a decoder module wherein the decoder module determines two words from the observation sequence representing an estimate of an intended text of the user;
       cause the display device to display the estimate of the intended text in the text entry interface and to display a confirmation icon in the text entry interface, wherein a selection of the confirmation icon indicates that the intended text is correct;
       cause, based on receiving user input indicating a correction to the intended text while the confirmation input is displayed in the text entry interface, a correction interface to be displayed on the display device;
       cause the correction interface to display the intended text and an insertion icon between the two words of the intended text, the insertion icon being a place to gaze at between the two words to initiate an insertion of a word at the place between the two words;
       receive gaze information indicating a selection of the insertion icon;
       based on the gaze information indicating the selection of the insertion icon, cause the display device to display a second visual representation of a plurality of letters, the second visual representation displayed in association with correcting the intended text in the correction interface;
       receive gaze information identifying a movement of the user's gaze on the second visual representation;
       replace the insertion icon in the correction interface with the word between the two words based on the movement of the user's gaze on the second visual representation; and
       cause the display device to display the word between the two words in the text entry interface.

16. The system for entering text into a computing device using gaze input from a user of claim 15, wherein an observation event comprises a determination that the user's gaze has fixated on or near a letter.

17. The system for entering text into a computing device using gaze input from a user of claim 15, wherein the computing device is further configured to at least:
    receive gaze information indicating a termination event, wherein causing the display device to display the estimate of the intended text occurs in response to the termination event occurring.

18. The system for entering text into a computing device using gaze input from a user of claim 15, wherein the decoder module comprises one or more algorithms comprising a token-passing decoder.

19. The system for entering text into a computing device using gaze input from a user of claim 15, wherein the decoder module comprises an adaptive learning function by which results of the decoding module are analyzed by the decoding module to adapt the decoding module to individual users.

20. A non-transitory machine readable medium having instructions stored thereon for entering text into a computing device using gaze input from a user, the instructions executable by one or more processors for at least:

causing a display device to display a text entry interface and a visual representation of a plurality of letters;

receiving gaze information identifying a movement of the user's gaze on the visual representation;

recording an observation sequence of one or more observation events that occur during the movement of the user's gaze on the visual representation;

providing the observation sequence to a decoder module wherein the decoder module determines two words from the observation sequence representing an estimate of an intended text of the user;

causing the display device to display the estimate of the intended text in the text entry interface and to display a confirmation icon in the text entry interface, wherein a selection of the confirmation icon indicates that the intended text is correct;

causing, based on receiving user input indicating a correction to the intended text while the confirmation input is displayed in the text entry interface, a correction interface to be displayed on the display device;

causing the correction interface to display an insertion icon between the two words of the intended text, the insertion icon being a place to gaze at between the two words to initiate an insertion of a word at the place between the two words;

receiving gaze information indicating a selection of the insertion icon;

based on the gaze information indicating the selection of the icon, causing the display device to display a second visual representation of a plurality of letters, the second visual representation displayed in association with correcting the intended text in the correction interface;

receiving gaze information identifying a movement of the user's gaze on the second visual representation;

replacing the insertion icon in the correction interface with the word between the two words based on the movement of the user's gaze on the second visual representation; and causing the display device to display the word between the two words in the text entry interface.

21. The non-transitory machine readable medium of claim 20, wherein an observation event comprises a determination that the user's gaze has fixated on or near a letter.

22. The non-transitory machine readable medium of claim 20, wherein the computing device is further configured to at least:

receive gaze information indicating a termination event, wherein causing the display device to display the estimate of the intended text occurs in response to the termination event occurring.

23. The non-transitory machine readable medium of claim 20, wherein the decoder module comprises one or more algorithms comprising a token-passing decoder.

24. The non-transitory machine readable medium of claim 20, wherein the decoder module comprises an adaptive learning function by which results of the decoding module are analyzed by the decoding module to adapt the decoding module to individual users.

\* \* \* \* \*